Aug. 21, 1956 P. A. BEZZERIDES 2,759,299
POSITIONING APPARATUS FOR HOT CAPS AND THE LIKE
Filed Jan. 10, 1955 2 Sheets-Sheet 1

PAUL A. BEZZERIDES
INVENTOR
HUEBNER, BEEHLER,
WORREL & HERZIG
ATTORNEYS
BY
Richard M. Worrel

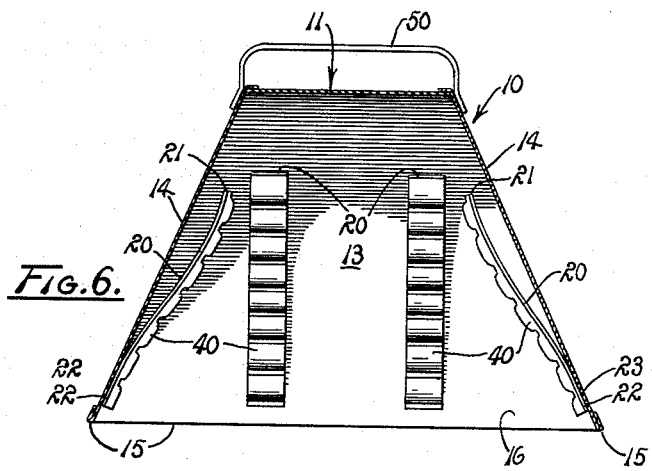
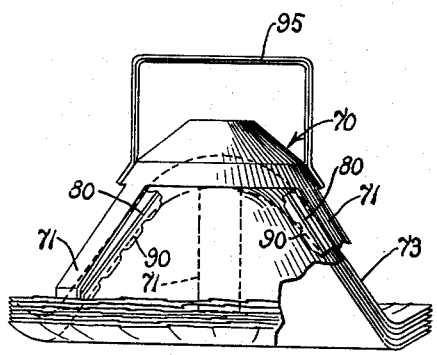
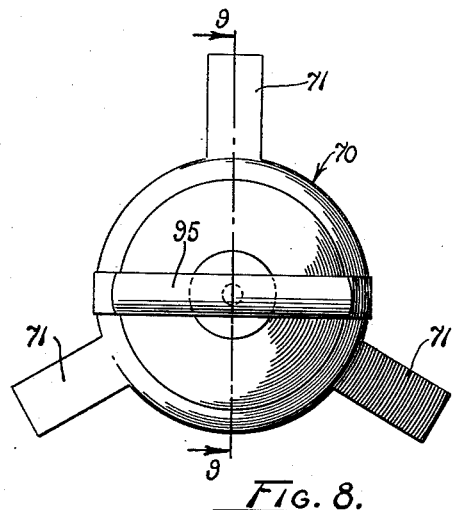
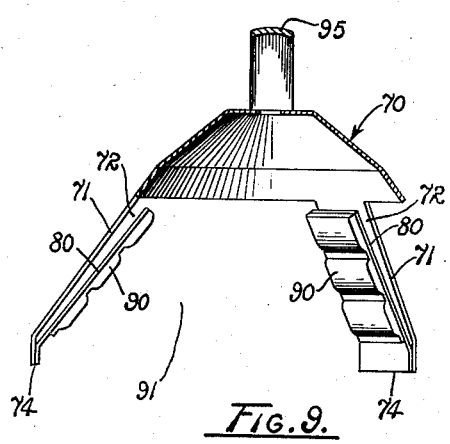

United States Patent Office 2,759,299
Patented Aug. 21, 1956

2,759,299

POSITIONING APPARATUS FOR HOT CAPS AND THE LIKE

Paul A. Bezzerides, Orosi, Calif.

Application January 10, 1955, Serial No. 480,983

2 Claims. (Cl. 47—1)

The present invention relates to positioning apparatus and more particularly to such devices for hot caps and the like.

In the never ending quest for earlier tomatoes, melons and other truck crops subject to destruction or deterioration by freezing, it has become the practice to plant in the spring before the danger of frost is over and to provide protective covers against frost. Such covers are commonly known as hot caps and usually consist of small tents of paper or other economical sheet material which can be positioned over the plants to confine heat and yet to admit light rays which foster plant growth and for conversion into heat. In order to impart a measure of waterproofing to the caps, to increase their durability and to increase the light transmissible properties of the paper, it is usually impregnated with wax, paraffin or other light transmissible water repellant material.

While the utilization of hot caps is a well accepted expedient for protecting tender crops planted early in the spring they are subject to certain well known limitations and problems that have restricted their use to those crops which can demand a premium if matured a few weeks or even a few days ahead of those grown without such artificial aids. The hot caps are usually received by the farmer in preformed condition and nested for compact storage and transportation. Following the planting of the seeds whose plants they are subsequently to protect, or the plants which already need protection when planted, the hot caps are manually positioned in covering relation thereto. This is a time consuming and quite expensive task. It is the usual practice for the laborers charged with the emplacing of the caps to carry nested stacks thereof along a row of the crop to be protected. The caps are removed from the stack one at a time and fitted downwardly over the plants or seed hills. The caps are preformed to conical, dome or other shape capable of housing the plants to be protected and can generally be referred to as inverted bowl-shaped. When separated from the stack into individual caps they are flimsy and difficult to handle without crumpling or other undesirable distortion. It is the conventional practice to employ positioning aids consisting of sheet metal receivers of a form generally complementary to the caps to be emplaced. These normally provide handles for convenience of manipulation. In locating the cap, it is usually necessary for the laborer to lay the stack of caps on the ground and to select one thereof with one hand while holding the positioning aid in the other hand. Once the cap is fitted into place, the aid with the cap therein is thrust downwardly over the plant or seed hill to be protected. When the lower edge of the cap is thrust into the soil a marginal edge thereof is disposed on the surface of the ground. Loose earth is then scraped into overlaying relation on the marginal edge while the cap is held firmly in place. This can either be done with the free hand or by the laborer scraping the dirt around the cap with his feet. The positioning aid is then withdrawn and the normally flimsy cap is held in sufficient rigidity by the earth heaped around the base thereof for dependable plant protection. The remaining stack of hot caps is then picked up and the whole procedure repeated at the next location of a plant or seed hill requiring protection.

The laborious and tedious nature of the task is self evident. Not only is the expense excessive but the slow progress possible makes it difficult quickly to position large numbers of the caps in as short a period of time, as is desired, within the limited periods of the day when sufficient environmental heat is present for the planting to be completed.

It is recognized that a substantial portion of the time required for the described process is devoted to laying down the carried stack of caps, withdrawing a single cap and inserting it into the positioning aid. Heretofore this task has defied mechanical performance largely because of the flimsy and relatively delicate nature of the caps. Elaborate vacuum and pressure devices have been considered but have been found generally unsatisfactory. They are not only expensive and require elaborate pumps and control valves but are so heavy that their presence in the field undesirably compacts the soil. Further their mass and inherent difficulty of precise control are not conducive to a rapid and effective performance of their intended function. Perforating barbs, as are well known in the handling of paper products of various kinds, are also not suited to the task for any perforations in the caps seriously impair their heat retaining properties and with such barbs not only perforations but actual tearing frequently occurs.

While the described selection of the caps and positioning in the aids is onerous in manual operations it is particularly so in semi-mechanical apparatus provided for the purpose. Machines of the type shown and described in my United States Patent No. 2,452,287 have proved excellently suited to the positioning of the dirt around the caps and in this respect have materially speeded up the task of hot cap installation but the manual cap selection and loading of the known positioning aids have precluded the attainment of full mechanical performance.

Therefore an object of the present invention is to provide an improved positioning device for hot caps and the like.

Another object is to provide a hot cap positioning device which when thrust downwardly upon a stack of hot caps, automatically selects the uppermost thereof, dependably retains the cap while it is located in desired position, and which automatically releases the cap after soil is deposited on the marginal edges thereof simply by withdrawal of the device.

Another object is to provide a device of the character described which is suited to both manual and mechanical hot cap emplacement.

Another object is to minimize the expenses incident to hot cap crop production and thus the cost of the resultant produce to the ultimate consumer.

Another object is to accelerate hot cap positioning so that increased numbers thereof can be located in desired position within the limit periods available for the purpose.

Another object is to provide a hot cap positioning device having automatic operating characteristics enabling mechanical performance of the entire hot cap positioning operation.

Another object is to provide such a device that is simple in structure, easy and economical to produce, durable, dependable and thoroughly effective in performing its intended functions.

Further objects and advantages will become apparent in the subsequent description in the specification.

In the drawing:

Fig. 6 is a section taken on line 6—6 of Fig. 1 with the hot cap omitted.

Fig. 7 is a side elevation of a second form of the invention rested on a stack of hot caps, portions of the device being broken away for illustrative convenience.

Fig. 8 is a plan view of the form of the device shown in Fig. 7.

Fig. 9 is a section taken on line 9—9 of Fig. 8.

Figure 1:
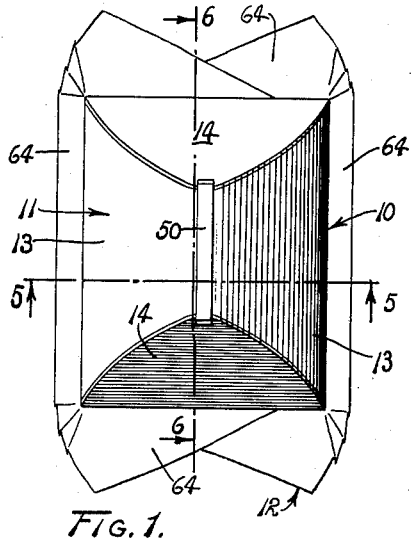
Fig. 1 is a plan view of a first embodiment of the present invention illustrated holding a hot cap downwardly into soil engagement as in emplacing such a hot cap for plant protective purposes.

Referring more particularly to the drawings:

A first form of the present invention is indicated generally at 10. A housing or holding member 11 is of well known form for positioning aids being generally complementary to an elongated dome-shaped hot cap of the popular form shown at 12. The holding member is cast or fabricated from sheet metal, plastic or other suitable material, preferably of air impervious character. It consists of a pair of arcuate side panels 13 and arcuate end panels 44 joined to provide a generally inverted bowl-shape hood. The arcuate side and end edges are respectively downwardly divergent for purposes soon to become apparent and terminate in a common lower edge 15 in substantially a common plane which circumscribes a downwardly disposed cap receiving opening 16. The holding member is preferably as light in weight as practical commensurate with adequate rigidity and durability for the purpose and possesses air tight integrity above the edge 15.

A plurality of elongated leaf springs 20 each having an upper end 21 and a lower end 22 are mounted within the holding member. These elements are also appropriately referred to as spring leaves or arms. The springs are located in substantially equally spaced relation about the interior of the holding member 11, two for each side wall and one for each end wall being adequate in even most large sizes, and the lower ends 22 thereof rigidly secured to their respective walls by welding, soldering, riveting or other suitable means at 23.

The springs 20 are transversely substantially flat and are arranged with their upper ends 21 extended away from the edge 15 in upwardly convergent relation to their respective panels and with the flat sides inwardly disposed. The springs are also downwardly divergent with respect to each other and define therebetween a hot cap receiving opening, chamber or receptacle 30. Said chamber, when the springs are relaxed, is slightly smaller than the hot cap to be received for subsequent resilient compression of the springs against the sides thereof.

Although the positioning device operates satisfactorily when the springs 20 are straight, they are preferably longitudinally slightly ogee in form. That is, they preferably curve slightly away from their respective sides of the holding member 11 upwardly from their lower ends and at substantially their midpoints reverse their curvature and bend somewhat toward their respective sides. The lower curvature serves to increase the spacing of the springs from the walls of the holding member to accommodate greater unobstructed flexing movement and the upper curvature assures the disposition of a substantially constant curvature toward hot caps inserted between the springs whether the springs are flexed or at rest.

Elongated transversely corrugated facing strips or pads 40 of resiliently compressible frictional material are mounted on the substantially flat faces of the springs 20 disposed toward the chamber 30. Sponge rubber is excellently suited to the purpose and is conveniently cemented into position.

When the positioning device 10 is intended for manual use a handle 50 is mounted on the upper portion of the holding member 11. It will be understood, however, that when it is intended for use in an automatic hot cap setting apparatus any other desired manipulating member or system may be employed and the device similarly employed.

Operation

Preliminary to brief reference to the operation of the described structure, reference is made to the hot caps shown at 12. Each hot cap is of thin waxed paper folded and secured to provide opposite downwardly divergent side walls 61 and opposite downwardly divergent end walls 62. The hot cap is substantially fitted to the holding member 11 already described. From the lower edge 63 of the cap, a circumscribing marginal edge 64 is extended laterally and somewhat upwardly therefrom. The hot caps are received in nested stacks and to use the device of the present invention the stack is held or rested with the caps in upright position.

Figure 2:
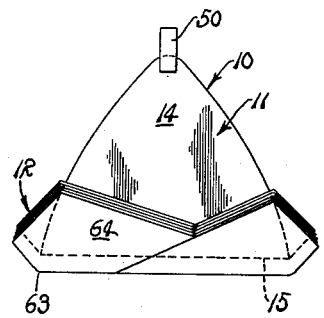
Fig. 2 is an end elevation of the device shown in Fig. 1 rested on a stack of nested hot caps.
Figure 3:
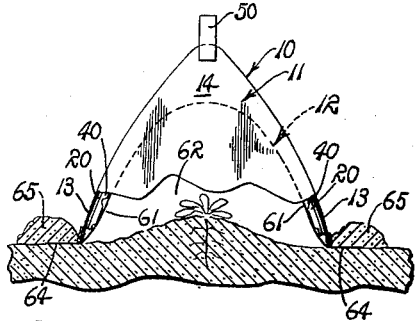
Fig. 3 is a vertical section of a plant hill and adjacent soil showing the device of the present invention locating a hot cap while marginal edges thereof are covered with soil, portions of the device and cap being broken away for illustrative convenience.
Figure 4:
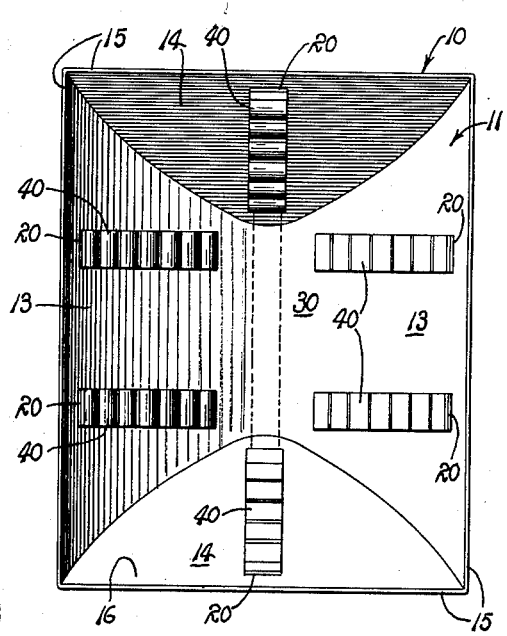
Fig. 4 is a bottom view of the device shown in Figs. 1, 2 and 3.
Figure 5:
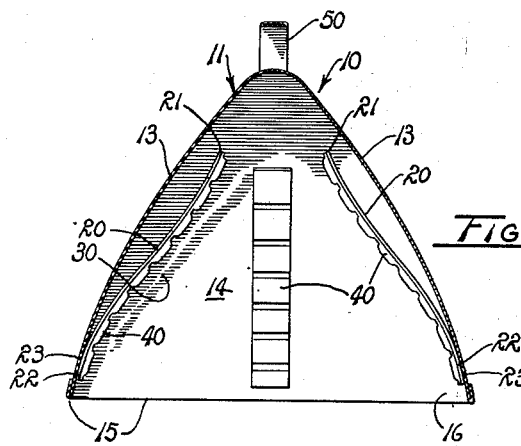
Fig. 5 is a section taken on line 5—5 of Fig. 1 with the hot cap omitted.

To load the positioning device 10 with a single hot cap 12, it is thrust downwardly over the top of the stack, as shown in Figs. 1 and 2. The springs 20 flex outwardly to receive the stack therebetween. Although the caps are normally so flimsy that they cannot resist any appreciable pressure thereagainst until their marginal edges 64 are covered with soil, arranged in the stack they are amply strong to cause the desired flexing of the springs. Even when the stack is depleted to a single cap, there is enough air trapped thereunder that a quick downward thrust of the holding member accomplishes the loading.

As the holding member 11 and the springs 20 move downwardly over the caps the pads 40 are seated in frictional engagement with the upper cap and the lower edge 15 is fitted against the lower edge 63 of the cap between the marginal edge 64 and the walls 61 and 62 thereof. Inasmuch as the air is substantially evacuated from the holding member 11 during this downward movement, upward movement of the holding member 11 tends to create a light vacuum between said member and the top hot cap of air in removing it from the stack. Of principal removing effect however, is the frictional engagement of the pads 40 with the side walls thereof under the constant urging of the springs 20.

The positioning device with the cap therein is then set downwardly over a plant or seed hill to be protected, as shown in Fig. 2, and soil deposited on the marginal edge 64 by manual, mechanical, or other means, as represented at 65. The positioning device is then lifted upwardly leaving the hot cap held in place by the soil deposited thereon.

Second form

A second form of positioning device is shown at 70 in Figs. 7, 8 and 9. In place of the air tight holding member 11 of the first form of the invention, it provides a plurality of substantially rigid legs 71 integrally interconnected and divergently extended in substantially equally spaced relation downwardly about an arm receiving compartment 72 of inverted bowl shape albeit there are spaces between the arms. As before, the device may be constructed to receive any desired shape of hot cap but in the second form is shown as adapted to receive a substantially conical hot cap 73 of popular form. The legs terminate in lower edges 74 disposed in a common plane.

Leaf springs or arms 80 are mounted on the legs in the manner of the springs 20 on the walls of the holding member 11 and define a hot cap receiving opening or chamber 91 therebetween.

Elongated facing strips or pads 90 are mounted on the springs 80 disposed inwardly of the chamber. As before, the pads are of resiliently compressible frictional material, such as sponge rubber. Also they are preferably although not necessarily transversely corrugated.

A handle 95 is rigidly mounted on the legs and serves to facilitate handling of the device. The operation of the second form is the same as for the first form with the exception that no vacuum effect is attained to augment the resilient grasping by the pads 90.

In actual use, it is found that the devices described effectively pick up the hot caps by simple thrusting of the devices downwardly thereover. It is also noted that they retain only a single hot cap at a time, only the uppermost thereof in any stack being frictionally engaged. Not only is the pick-up or loading effectively and speedily accomplished but the hot caps are dependably retained and can be carried, manipulated, positioned and the like without danger of inadvertent discharge. Once the hot cap is secured by the dirt deposit 65 or other holding means, the devices are easily withdrawn from the hot caps without molesting them.

Utilization of the devices described does not perforate, tear or otherwise damage the hot caps. They have made possible the reduction of hot cap installation labor costs to a fraction of that previously required even when entirely manual operation thereof is relied upon. Additionally, the automatic loading and releasing features have for the first time made it possible to adopt mechanical aids to hot cap installation to full automatic operation.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for positioning hot caps comprising a body member having a downwardly disposed concave receptacle therein defined by downwardly divergent side walls interconnected in substantially air tight integrity and terminating at a common lower edge in circumscribing relation to the defined receptacle, a plurality of elongated longitudinally ogee spring leaves having lower end portions rigidly mounted within the body member in substantially equally spaced relation from each other adjacent to the lower edge of the walls, the leaves having upwardly extended divergent ends and substantially transversely flat inwardly disposed faces, and elongated strips of sponge rubber secured to the faces of the leaves having inwardly disposed transversely corrugated hot cap engaging surfaces.

2. In a hot cap positioning device, the combination of an inverted bowl-shape member having downwardly divergent walls terminating in a common lower edge circumscribing a receiving opening, said member being of substantially air-impervious material and of air tight integrity except for the receiving opening, a plurality of elongated longitudinally ogee spring leaves mounted within the bowl-shape member on the side walls in substantially equally spaced relation from each other adjacent to the lower edges of the walls and having upwardly extended relatively convergent ends and substantially flat inwardly disposed faces, elongated strips of sponge rubber secured to the faces of the spring leaves having transversely corrugated faces disposed inwardly for hot cap engagement, and means mounted externally on the bowl-shape member for carrying and positioning said member.

References Cited in the file of this patent

UNITED STATES PATENTS

| 577,829 | Brown | Feb. 23, 1897 |
| 1,194,992 | Gibson | Aug. 15, 1916 |
| 1,750,568 | Carew | Mar. 11, 1930 |
| 2,483,167 | Amberg | Sept. 27, 1949 |
| 2,486,907 | Amberg | Nov. 1, 1949 |

FOREIGN PATENTS

| 197,596 | Canada | Mar. 2, 1920 |